United States Patent [19]

Gilb et al.

[11] 4,367,973

[45] Jan. 11, 1983

[54] STRUCTURAL STRAP TIE

[75] Inventors: Tyrell T. Gilb, Berkeley; Alfred D. Commins, Livermore, both of Calif.

[73] Assignee: Simpson Manufacturing Co., Inc., San Leandro, Calif.

[21] Appl. No.: 253,679

[22] Filed: Apr. 13, 1981

[51] Int. Cl.³ .......................... B25G 3/00; F16D 1/00; F16G 11/00

[52] U.S. Cl. ...................................... 403/405; 52/687; 428/573; 428/597

[58] Field of Search .................... 403/405, 232.1, 231, 403/283; 52/289, 687, 105; 428/573, 597

[56] References Cited

U.S. PATENT DOCUMENTS

| 1,336,193 | 4/1920 | Bryan | 403/405 |
| 1,714,174 | 5/1929 | Lichtenberg et al. | 52/105 |
| 2,087,595 | 7/1937 | Goslin | 52/555 |
| 2,619,375 | 11/1952 | Merrill | 428/597 |
| 3,225,952 | 12/1965 | Stiles | 403/405 |
| 3,427,055 | 2/1969 | Jureit et al. | 403/231 |
| 3,854,268 | 12/1974 | Gutner | 403/231 |

FOREIGN PATENT DOCUMENTS

| 119700 | 9/1947 | Sweden | 403/405 |
| 128412 | 6/1950 | Sweden | 403/405 |
| 1411193 | 10/1975 | United Kingdom | 403/353 |

Primary Examiner—Wayne L. Shedd
Attorney, Agent, or Firm—James R. Cypher

[57] ABSTRACT

A metal structural tie strap for fastening two or more nailable wood members to one another; the strap being formed with nail openings which are equidistant from one another and fall within nail holding means adjacent the edges of the strap. The edges of the strap transverse to the longitudinal axis of the strap are non-linear, forming a pattern in which the leading edge is a reverse image of the trailing edge.

4 Claims, 5 Drawing Figures

STRUCTURAL STRAP TIE

BACKGROUND OF THE INVENTION

One of the earliest metal connectors provided for the building industry for connecting two wood members was the structural strap tie. There is no known recorded earliest use of metal straps. Smelted iron has been found dating from 2700 B C at Tell Chagar Bazar (northern Syria) but metal was scarce and did not come into common use until about 1000 B C. We can assume that metal straps have been in relatively common use for connecting two timber members from about the first millennium B C until the present.

Even though metal straps have been in common use for nearly three thousand years and metal has been a commodity which has always required careful design to conserve its usage, even today straps are formed in rectangular configurations with straight edges; a form identical to earliest times. An example of a metal strap of the traditional rectangular shape with straight edges is shown in the catalog of one of the largest metal connector manufacturers. (See Prior Art Simpson Catalog 1981, Page 23).

No attempt had been made to change the rectangular strap except to change the nail patterns to meet local and national building codes. The spacing between holes is dictated by building codes for each typical nail size. This has resulted in a slightly improved strap as illustrated by the staggered nail design found in the MST type of strap found in the 1981 Simpson catalog, supra.

A further building code and practical requirement is that the edge distance (in the case of steel) between any nail hole and the nearest edge of the metal shall be not less than one and one-half times the dimension from the center of the hole to the edge of the metal.

Although many have known that rectangular metal straps with straight edges used as a structural tension member had an excess net section which was wasteful of metal; the design remained unchanged for lack of a more efficient design and cost effective method of producing such straps.

SUMMARY OF THE INVENTION

The key to the present invention is a patterned edge design and the use of a different progressive die method to produce the straps. Coils of metal ranging from about 10" up to approximately 34" are fed through a progressive die which cuts the straps to the desired widths and with the desired patterns transverse to the feed direction. The straps are formed with an edge pattern described more fully hereunder.

The resulting straps cut in either the preferred or alternate way retain the same calculated holding strength as rectangular straps with straight edges but surprisingly have a material savings of 15 to 20% depending on the edge pattern adopted. Straps of different lengths may be produced by relatively simple changes of the dies.

The 15 to 20% savings in material to the manufacturer also translates into a 15 to 20% savings in weight which decreases shipping costs and results in easier bulk handling.

The use of an edge pattern in relation to the nail openings appears to highlight the nail openings and it is expected that there will be a greater tendency to place a nail in each opening and have less skipped openings than with standard straight edge straps.

DESCRIPTION OF THE PREFERRED EMBODIMENTS

Figure 5:
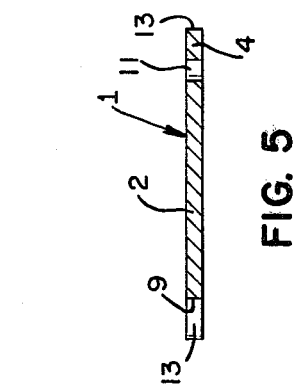
FIG. 5 is a cross sectional view of the strap shown in FIG. 3 and taken along line 5—5.
Figure 1:
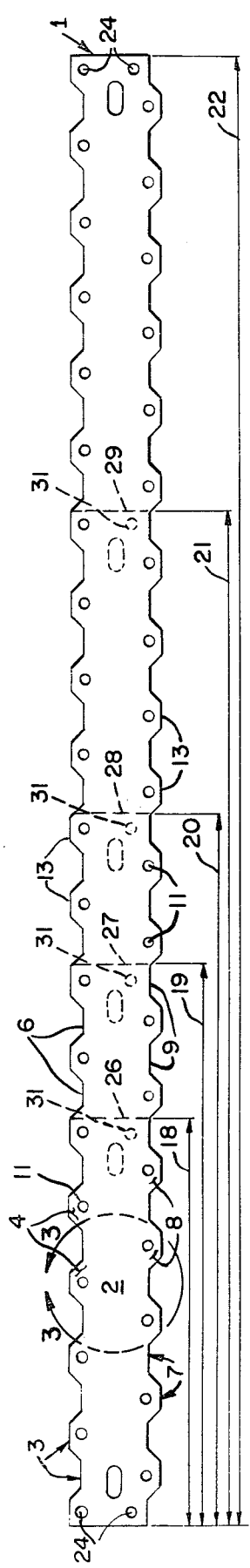
FIG. 1 is a top plan view of the preferred form of the strap formed in accordance with the present invention. The dotted transverse lines at irregular intervals longitudinally of the strap indicate different commercial lengths as measured from the left side of the sheet and indicated by arrows.

The metal strap tie of the present invention is used for tying nailable timber members to one another. The strap tie illustrated in FIG. 1 is formed with a mid-portion 2 having a length substantially greater than its width and substantially free of fastener openings providing a structural member for providing substantial resistance to tension forces. The strap includes a leading outboard portion 3 forming a patterned edge and forming a series of leading nail holding areas 4 and alternating leading cutout areas 6 integral with the mid-portion 2. On the other side of the strap from the leading outboard portion 3 is the trailing outboard portion 7 forming a patterned edge and forming a series of trailing nail holding areas 8 and alternating trailing cutout areas 9 integral with the midportion 2.

Figure 3:
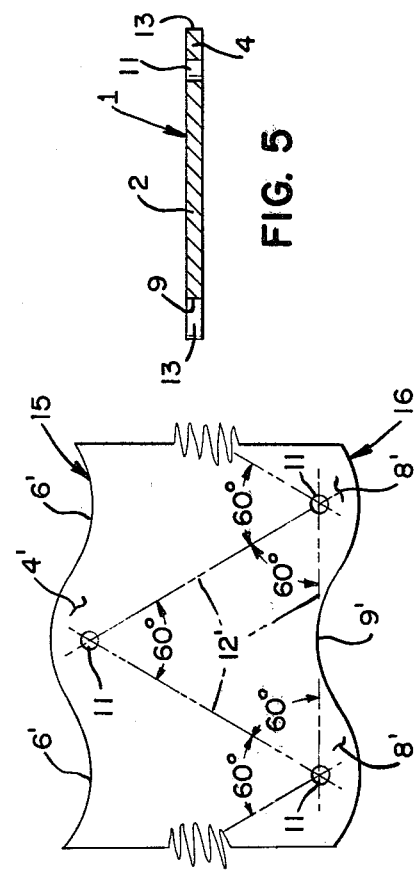
FIG. 3 is an enlarged portion of the strap shown in FIG. 1 and along line 3—3.
Figure 4:
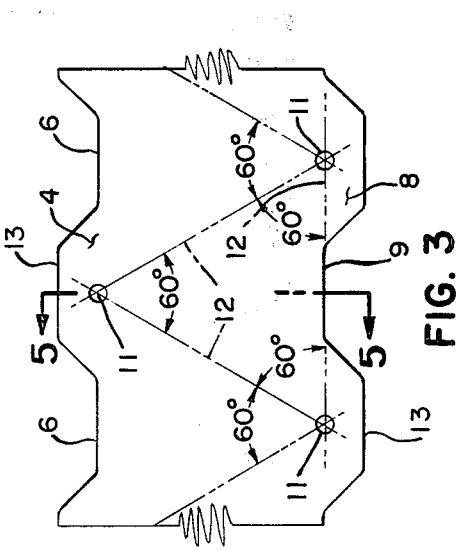
FIG. 4 is an enlarged portion of the strap shown in FIG. 2 and taken along line 4—4.

The leading nail holding areas 4 are positioned so that they are generally transversely opposed to the trailing cut-out areas 9. Nail openings 11 are formed in substantially all of the nail holding areas. The nail openings are positioned so that projection lines 12 joining the nail openings form substantially equilateral triangles as shown in FIG. 3. The angles joining the projection lines are substantially 60 degrees.

In the preferred form of the invention illustrated in FIG. 1, the nail holding areas 4 and 8 are formed with straight line edge portions 13 which are parallel to the longitudinal axis of the strap. It has been found that the provision of parallel straight line edges on the straps makes it easier for workmen to align the strap with the timber members being secured together.

Figure 2:
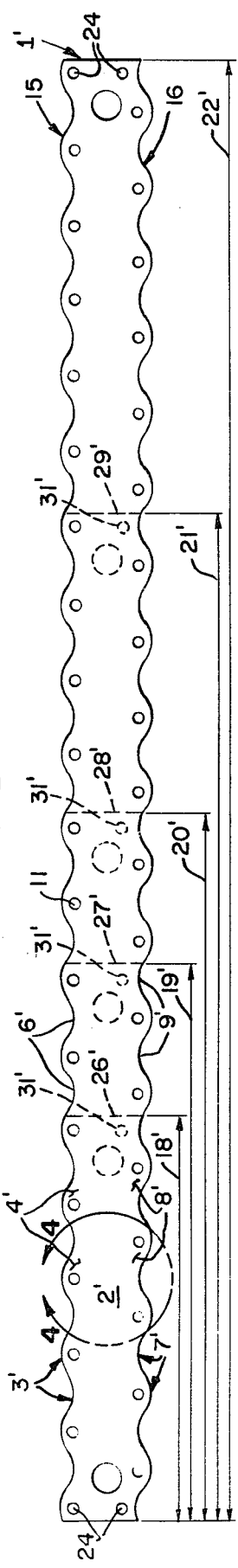
FIG. 2 is a top plan view of an alternate form of the strap. The dotted transverse lines at irregular intervals longitudinally of the strap indicate different commercial lengths as measured from the left side of the sheet and indicated by arrows.

FIG. 2 illustrates an alternate form of the invention described in FIGS. 1 and 3. Identical or equivalent parts are designated by the same numbers and distinguished only by a prime symbol (') after the number. The distinguishing characteristics of this form of the invention is the fact that the nail holding areas 4' and 8' and cutout areas 6' and 9' are formed with leading and trailing continuous curvilinear serpentine-like edges 15 and 16. In this form of the invention, the metal savings is maximized with savings of about 20% possible.

In both forms of the invention, the nail openings 11 fall substantially along straight lines generally coincident with the inner edges of the cutout areas.

In producing the straps by progressive die forming methods, several commerical lengths may be obtained by simply selecting wider coils and adding die sections. As illustrated in FIGS. 1 and 2, arrows 18–22 indicate different length straps which may be sheared with the same progressive die equipment. The broken lines 26–29 indicate the ends of the straps corresponding to arrows 18–22.

As an example of a tie strap of the present invention dimensioned for use with 16d nails and 16 or 20 gauge thickness, lengths of 9 5/16ths, 12 13/16ths, 16 5/16ths, 23 5/16ths and 33 13/16ths inches may be provided. The nail hole spacing may be exactly 1¾ inches center to center between any three holes. Building codes provide that the edge distance between any nail hole and the nearest edge of the metal shall be not less than one and one-half times the dimension from the center of the hold to the edge of the metal for steel.

The tie straps are produced from a continuous coil of constant width which is sheared transverse to the longitudinal axis of the strap. The pattern in the leading and trailing edge is designed so that the strap nests into the next strap. No particular pattern for the edge cut is required. Figure one illustrates edge cuts with straight lines while FIG. 2 shows the edge cuts with continuously curved lines. The edges could be patterned with straight lines and curved lines. Further the angles between the straight lines could be changed and the radius of the curved lines could be changed, so long as the nail hole to edge distances remained within the strictures of the building code.

Nail openings may be provided in the ends of the tie straps. The nail openings at both ends are indicated by the number 24. Nail openings 24 are not necessarily formed in alignment with openings 11. These nail openings need only follow the edge distance requirements of the building codes.

End nail openings are provided regardless of the length of the tie strap. In FIGS. 1 and 2, because of the composite nature of the drawings, those nail openings 31 shown in dotted line are to be omitted where the tie strap extends beyond the broken lines indicated by the numbers 26–29 which are immediately adjacent the dotted nail openings.

We claim:

1. A metal strap tie 1 for joining nailable timber members comprising:
   a. a mid-portion 2 having a length substantially greater than its width and substantially free of fastener openings providing a structural member for providing substantial resistance to tension forces;
   b. a leading outboard portion 3 forming a patterned edge and forming a series of leading nail holding areas 4 and alternating leading cutout areas 6 integral with said mid-portion;
   c. a trailing outboard portion 7 forming a patterned edge and forming a series of trailing nail holding areas 8 and alternating trailing cutout areas 9 integral with the opposite side of said mid-portion;
   d. said leading nail holding areas 4 are positioned so that they are generally transversely opposed to said trailing cut-out areas 9;
   e. nail openings 11 formed in substantially all of said nail holding areas; and
   f. said nail openings are positioned so that projection lines 12 joining said nail openings form substantially equilateral triangles.

2. A metal strap tie as described in claim 1 wherein:
   a. said nail holding areas 4 and 8 are formed with a straight line edge portion 13 parallel to the longitudinal axis of said strap.

3. A metal strap tie as described in claim 1 wherein:
   a. said nail holding areas and cutout areas are formed with spaced continuous curvilinear serpentine-like edges 15 and 16.

4. A metal strap tie as described in claim 1 wherein:
   a. said nail openings fall substantially along straight lines generally coincident with the inner edges of said cutout areas.

* * * * *